Aug. 29, 1967  R. D. COLCHAGOFF ET AL  3,338,699
GLASS FORMING APPARATUS
Filed April 22, 1964  2 Sheets-Sheet 2
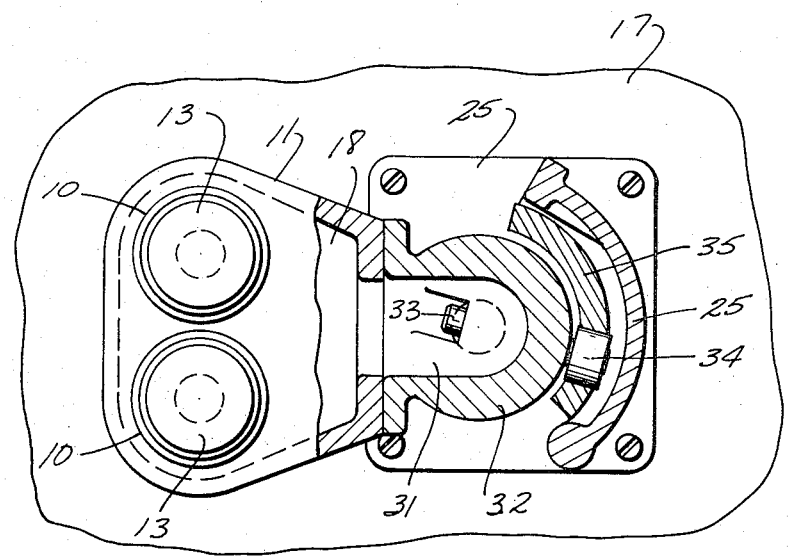
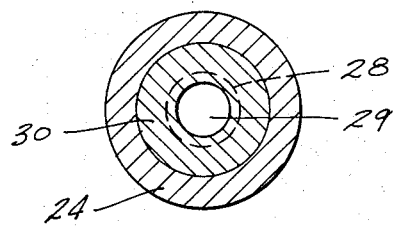
INVENTORS
ROBERT D. COLCHAGOFF
EUSTACE H. MUMFORD
BY
J. R. Nelson and
W. A. Schaich
ATTORNEYS United States Patent Office 3,338,699
Patented Aug. 29, 1967

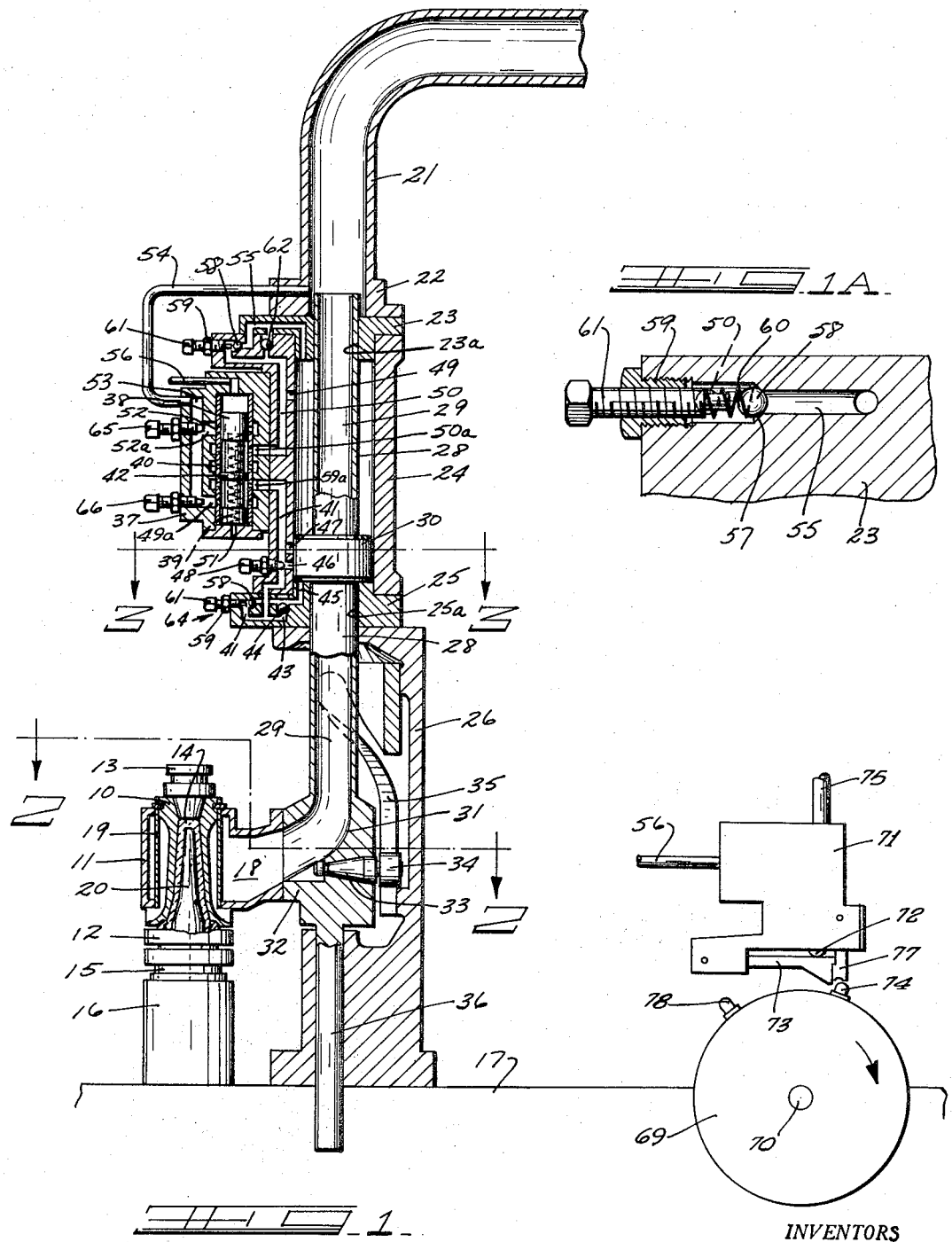

3,338,699
GLASS FORMING APPARATUS
Robert D. Colchagoff, Toledo, Ohio, and Eustace H. Mumford, Ottawa Lake, Mich., assignors to Owens-Illinois Inc., a corporation of Ohio
Filed Apr. 22, 1964, Ser. No. 361,813
4 Claims. (Cl. 65—356)

The present invention relates to glassware forming machines, and in particular to an improved mold carriage mechanism on the machine of the type disclosed in R. B. Abbott et al., U.S. Patent No. 3,024,571.

Prior machines have utilized a blank mold mechanism wherein the blank mold is comprised of complementary halves and these are mounted for carriage on complementary scissors-type arms pivoted on a vertical shaft or boss for moving the blank mold into and out of glass molding position with respect to a neck mold and plunger or neck pin unit. An example of this is in H. W. Ingle's Patent 1,911,119.

More recently, a glass forming machine employs a solid or "one-piece" blank mold that is open at both its axial ends, and this mold is mounted on a carriage, such as shown in the R. B. Abbott et al., U.S. Patent No. 3,024,571. In this machine, the mold carriage is in the form of a cylinder-piston assembly mounted in the machine base below the glass molding position of the neck molds and plunger. The piston rod extends vertically and is attached to a hollow mold holder supporting the one-piece blow mold. The piston rod extends vertically above this connection into a hollow passage in the form of telescopic pipe for conducting cooling air into the hollow mold holder to cool the mold. A dampening means is connected to the end of this shaft to reduce the "bounce" and vibration in bringing this mechanism to rest.

The present invention has for one of its objects an improved mold carriage apparatus in which the piston rod is hollow and thus eliminates structure in the prior machine in that the passage through the piston rod is connected to the source of the cooling medium and connected to the mold support or bracket supplying the cooling medium to the mold.

A further object of the invention is to provide a mold carriage and motor mounted entirely on a support above the molding position of the neck mold and plunger of the machine so that the mold carriage is more readily accessible on the machine for adjustment and maintenance.

Another object of the invention is to provide a motor control for the reciprocating cylinder-piston type drive motor for the mold carriage which has improved internal pneumatic dampening means effective at the extreme portions of the stroke of the motor as the mold nears its molding position on the neck mold or as it nears a remote raised position of rest. A further desirable objective in this connection is the provision of dampening means that minimizes "chatter" or "hunting" effect as the mold, mold carriage unit is decelerated from rapid travel to rest at the glass molding position.

A further object of the invention is to provide the improved mold carriage mechanism referred to which is pneumatically driven by the cylinder-piston assembly and which is muffled in an efficient manner by exhausting the compressed air from the cylinder motor into the passage for the mold coolant.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:
FIG. 1 is a sectional elevational view of the improved blank mold carriage and mold cooling system of the present invention. The figure also includes a somewhat schematic showing of the machine timing system which effects the sequential operation of the mold carriage in moving the one-piece mold between its glass molding position on the neck mold and a raised remote position.

FIG. 1A is an enlarged sectional view illustrating in greater detail the cushion valve means provided in the invention.

FIG. 2 is a sectional plan view of the mechanism taken along line 2—2 on FIG. 1.

FIG. 3 is a sectional plan view of the motor taken along line 3—3 on FIG. 1.

The preferred form of the invention is disclosed on FIG. 1 as used in conjunction with a Hartford-Empire I.S. type glassware forming machine. Such a machine is more completely illustrated and described in connection with the preferred one-piece blank mold in the above-mentioned U.S. Patent No. 3,024,571. The forming machine section of FIG. 1 embodies a one-piece blank mold unit 10 which is mounted on a hollow mold support bracket or mold holder 11 in inverted position. As shown, the mold 10 is open at its opposite axial ends and the lower opening is registered on the cavity of a neck mold 12 in a glass forming position. A gob or charge of glass is fed to the cavity of each mold 10 through the upper open end by a conventional gob feeder and funnel. Once the glass gob is in mold 10, an upper baffle 13 is lowered and locked in position by its carriage means and lock (not shown).

In the present disclosure, the drawings, at FIG. 2 especially, illustrate a double cavity mold structure, but, of course, the invention is equally applicable to a single mold structure.

The mold 12 is on mold arms (not shown) adapted to swing about a horizontal axis and transfer the inverted formed parisons of glass 14 formed by the cavity of molds 10 to a pair of blow molds (not shown) where the parisons are blown to final shape of hollow glassware, e.g., a bottle or jar. The neck mold 12 is closed about a guide thimble (not shown) on the plunger housing 15. Plunger housing 15 includes a pneumatically-operated plunger cylinder 16 that is supported by a frame of the machine which includes the top plate 17. A plunger 20 is operated reciprocally by the cylinder-piston of unit 16 between the glass pressing position shown and a retracted position.

Referring again to mold holder 11, the annular one-piece blank molds 10 are supported by this member and enclosed along their length by a cooling chamber 18 (FIG. 2). Around the periphery of each of the molds 10 are perforate sleeves 19 for applying cooling medium in chamber 18 onto the exterior of molds 10 in any desired pattern.

The coolant is supplied to chamber 18 under pressure, such as 2-5 p.s.i. air, from a source that is connected to the pipe 21. Pipe 21 has a gland fitting at 22 that fastens it onto the upper cylinder head 23 of cylinder 24. The cylinder 24 has a lower cylinder head 25 that is fastened on the vertical support casting 25. The support casting 26 is fastened onto reference lugs (not shown) on the upper surface of top plate 17 for the frame. The upper cylinder head 23 and lower cylinder head 24 each have a central axial opening, respectively numbered 23a and 25a, fitted with suitable sealing rings—such as O-rings (not shown)—which provide a fluid tight passage for axial movement of the hollow piston rod 28 of the motor. The piston rod defines a passage 29 for coolant and this connects at its upper end internally of pipe 21 and extends axially through piston 30 to the lower elbow 31 whereat the passage 29 connects into chamber 18.

The means for carrying the mold comprises the aforementioned mold support bracket and a lateral arm casting 32 defining the elbow passage 31. The arm-casting 32 is securely fastened to the lower end of the piston rod 28. Casting 32 is provided with a horizontal stub shaft 33 for pivotally mounting a cam follower roller 34. The roller 34 rides in a cam track 35 which extends vertically and along its length is also curved to impart a preferred radial swinging movement to the mold and mold carriage during reciprocal vertical travel imparted by the movement of piston 30 in the cylinder. On the lower end of the casting 32 is a vertical guide shaft 36 which telescopically slides in a guideway of the vertical support casting 25 and into the machine frame.

In the operation of the invention, the motor is operated by a motor control means which comprises a pilot-operated valve 37 having a valve spool 38 that is spring-loaded by an internal spring 39 compressed axially in the hollow spool. A source of fluid under pressure, such as compressed air at 50 p.s.i., is connected into the valve at the annular pressure inlet 40. The valve is normally set by the spring 39 to connect the air pressure to the lower cylinder fluid passage 41 when the central land 42 of the valve spool is above the pressure inlet 40. The compressed air is conducted by passage 41 through the passage 43 unseating the ball 44 of the ball check and into the end port 45 in the lower cylinder head 25. This will drive piston 30 upwardly until the lower radial ports 46 and 47 are progressively uncovered by the piston; whereupon, the compressed air will have entry to the lower cylinder by these ports. The radial port 46 is provided with an adjustable needle valve 48, which serves toward providing a cushion feature for the piston on downward movement. This feature will be presently described hereinafter in detail.

There is a pilot pressure means connected to the motor control valve for operating the motor in effecting sequential movement of the mold between its molding position and a raised, remote position. In the preferred form of the invention, the timing mechanism on the I.S. machine performs the function of the pilot pressure operating means. This mechanism comprises the usual timing drum 69 driven by rotating shaft 70 in the direction indicated. The valve chest 71 includes a poppet valve having a spring loaded valve stem 72 operated by a latch lever 73. The lever 73 is raised by engagement with the short button 74 in an aligned position on drum 69 which sets valve stem 72 to connect the source of fluid under pressure, such as 45 p.s.i. compressed air, in pipe 75 through the valve to pipe 56 and this is in turn connected to the top end of the valve chamber of valve 37 to shift valve spool 38 against spring 39 to the setting shown on FIG. 1. The vent hole 51 maintains atmospheric pressure beneath the valve spool in the valve chamber. The lever 73 is latched in the "up" position by the latch lever 77. The pilot air pressure will stay on for a duration corresponding to the rotary travel of the drum between button 74 and high button 78. When the latter engages the lever 73 it rotates clear of latch lever 77 and causes the valve stem 72 to shift downwardly and disconnect the pilot air pressure.

As the air pressure under piston 30 causes it to rise, the air above the piston is exhausted through the radial cylinder port 49 connected to the upper fluid passage 50 of the valve. This passage is connected to the annular outlet 50a that is connected with the valve chamber of valve 37. The valve chamber has an outlet 52 into passage 52a for exhausting the air into the main exhaust passage 53 connected with exhaust pipe 54. The latter is connected into the pipe 21 so that any exhaust from the motor 37 will be made into the blank mold coolant that is carried by pipe 21. By so doing, the air exhaust from the motor is muffled and in the factory the noise level is thereby reduced. When the piston reaches the point where it covers the radial port 49, exhaust of the air is then made through the top cylinder port 55 in the top cylinder head 23. This port 55 includes a passage to a seat 57 for a ball member 58 which comprises a one-way cushion valve (FIG. 1A). The ball 58 is held against seat 57 by spring 60 compressed against the ball by the adjusting screw 61 in the threaded keeper 59 that is fastened in the cylinder head 23. There is a ball check valve 62 which prevents exhaust air direct flow into the valve passage 50. By the adjusted spring tension against ball member 58 the ball creates a cushion or back pressure in the system set as desired. The member 61 also serves as a throttle restriction in the valve passage that connects with the fluid passage 50.

As above described, a cushion valve is also provided for exhaust from beneath the piston 30 through the fluid passage 41. Assuming the motor control valve is set, as shown on FIG. 1, by pilot fluid applied in pipe 56 causing the valve stem to move to its illustrated lower position. The compressed air that enters annular inlet 40 of the valve is connected into the valve chamber above land 42 of the valve stem and enters the fluid passage 50 of the valve. If the piston 30 starts from rest at the top of cylinder 24, air will pass through ball check valve 62 and into the top end port 55 thereby moving the piston downward. Air will exhaust from beneath the piston through the unrestricted radial port 47 in the cylinder which is connected to passage 41 and through the valve chamber outlet 59a and into exhaust passage 49a, 53 and exhaust pipe 54. After the piston uncovers radial port 49 in the cylinder, air pressure will be supplied through it and exhaust will be through port 47. At such time as the piston covers port 47, exhaust of air from the cyinder will, for a short while, be made through radial port 46 equipped with the adjustable needle or throttle member 48. This provides an initial cushion in the motor at the time when the mold is nearly in its glass molding position on the neck mold. As the port 46 gradually is covered, a final cushion is provided by the lower cushion valve 64. Valve 64 is constructed similarly as the one shown on FIG. 1A, described earlier, and accordingly the same numerals will be used in describing this lower cushion valve. Air now will exhaust through the bottom end port 45 of the cylinder and by reason of the ball check 44 will flow to unseat the ball member 58 of the valve 64 which is spring biased. This will provide a further cushion at the lower end of the stroke of the piston at the time the mold 10 is placed in contact with the neck mold 12 at the glass molding position of the former.

An important feature of the invention resides in the fact that on this lowering movement, a double dampening cushion is provided by the valves 48 and 64. By initially slowing the piston on the downstroke by valve 48, the fluctuating or hunting effect of the second cushion valve is minimized so that the molds 10 smoothly glide into glass molding position; yet, their movement between the raised position to the molding position is rapid for maximum cycle speed of the forming machine.

In this latter connection, speed valves 65 and 66 are respectively provided in the motor control valve exhaust outlets 52a and 49a. Accordingly, the downward speed of movement of the piston may be regulated by the throttle valve 66 and the upward speed of movement of the piston may be regulated by the throttle valve 65.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:
1. A mold carriage for bringing a glass mold to and from a glass forming position comprising, a vertical frame, a vertically disposed fluid motor cylinder mounted on said frame and having axial openings through the ends thereof, a piston rod extending axially through said cylinder and through its axial openings, a piston fixed to said piston rod intermediate its ends and positioned within said cylinder, said piston rod comprising an elongated, tubular member defining a vertical passage extending throughout its length, a radially extending mold mounting means connected to the lower end of said piston rod, said mounting means being formed with a hollow passage therethrough for conducting cooling fluid to a mold on said mounting means, conduit means connected to the upper end of said motor cylinder, said conduit communicating with said piston rod passage for supplying cooling fluid to the latter, a stationary cam track carried by said vertical frame, said cam track having a lower vertical section and an upper arcuate section, a cam follower positioned in contact with said cam track, said cam follower being connected to the lower end of said piston rod and extending radially outward from said piston rod in a direction 180° displaced from the radial direction of said mold mounting means, a source of fluid under pressure, means connected to said cylinder for alternately supplying said fluid under pressure to the opposite ends of said cylinder for affecting reciprocation of said piston within said cylinder, whereby the mold on said mounting means is moved between an elevated remote position, and forming position and coolant is supplied to the mold through the piston rod and the mold mounting means.

2. The apparatus of claim 1, wherein the source of fluid under pressure is air and the means for alternately connecting the fluid to opposite ends of said cylinder includes an exhaust chamber for receiving exhausting air from the ends of the cylinder responsive to movement of said piston and conduit means connecting said exhaust chamber to the conduit means connected to the upper cylinder end, whereby the exhaust of air under pressure from said cylinder is muffled in said conduit means.

3. The apparatus of claim 1, wherein said means connected to said cylinder for alternately supplying said fluid under pressure to the opposite ends of the cylinder comprises, a pilot-pressure, fluid-operated motor control valve mounted on said cylinder and having a first fluid passage means connected to the top end of said cylinder and a second fluid passage means connected to the bottom end of said cylinder and a radial port, said radial port formed in the side wall of said cylinder and spaced from the bottom end of the cylinder such that the radial port is covered by the piston in its latter portion of downward movement, said valve being operable for alternatively connecting said first and second fluid passage means to said source of operating fluid and to exhaust, a one-way, yieldable cushion valve means in said second fluid passage means disposed between said bottom end port and said radial port, said cushion valve regulating the flow of fluid from said end port to exhaust thereby cushioning the final portion of piston movement in the downward direction when bringing the mold into its said molding position.

4. A mold carriage for bringing a glass mold to and from a glass forming position comprising, a vertical frame, a vertically disposed fluid motor cylinder mounted on said frame and having axial openings through the ends thereof, a piston rod extending axially through said cylinder and through its axial openings, a piston fixed to said piston rod intermediate its ends and positioned within said cylinder, a radially extending mold mounting means connected to the lower end of said piston rod, a stationary cam track carried by said vertical frame, said cam track having a lower vertical section and an upper arcuate section, a cam follower positioned in contact with said cam track, said cam follower being connected to the lower end of said piston rod and extending radially outward from said piston rod in a direction 180° displaced from the radial direction of said mold mounting means, said cylinder having a pair of ports opening into the top and bottom ends of the cylinder, a radial port in said cylinder and spaced from the bottom end of the cylinder such that the radial port is covered by the piston in its latter portion of downward movement, a source of motor operating fluid under pressure, a pilot-pressure, fluid-operated motor control valve mounted on said cylinder and having a first fluid passage means connected to said top end port and a second fluid passage means connected to said bottom end port and said radial port, said valve being operable for alternatively connecting said first and second fluid passage means to said source of operating fluid and to exhaust, a one-way, yieldable cushion valve means in said second fluid passage means disposed between said bottom end port and said radial port, said cushion valve regulating the flow of fluid from said end port to exhaust thereby cushioning the final portion of piston movement in the downward direction when bringing the mold into its said molding position.

References Cited
UNITED STATES PATENTS

| | | | |
|---|---|---|---|
| 3,024,571 | 3/1962 | Abbott et al. | 65—356 XR |
| 3,137,560 | 6/1964 | Ketcham | 65—356 |
| 3,178,276 | 4/1965 | Kawecka et al. | 65—356 |

DONALL H. SYLVESTER, *Primary Examiner.*

S. LEON BASHORE, *Examiner.*

F. W. MIGA, *Assistant Examiner.*